US011011175B2

(12) United States Patent
Kang

(10) Patent No.: US 11,011,175 B2
(45) Date of Patent: May 18, 2021

(54) SPEECH BROADCASTING METHOD, DEVICE, APPARATUS AND COMPUTER-READABLE STORAGE MEDIUM

(71) Applicant: Baidu Online Network Technology (Beijing) Co., Ltd., Beijing (CN)

(72) Inventor: Yongguo Kang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 48 days.

(21) Appl. No.: 16/563,491

(22) Filed: Sep. 6, 2019

(65) Prior Publication Data

US 2020/0135210 A1 Apr. 30, 2020

(30) Foreign Application Priority Data

Oct. 25, 2018 (CN) .......................... 201811251300.1

(51) Int. Cl.
*G01L 17/00* (2006.01)
*G10L 17/00* (2013.01)
(Continued)

(52) U.S. Cl.
CPC .............. *G10L 17/00* (2013.01); *G10L 17/02* (2013.01); *G10L 17/06* (2013.01); *G10L 25/90* (2013.01)

(58) Field of Classification Search
CPC ......... G10L 13/00; G10L 13/04; G10L 13/08; G06N 3/02
See application file for complete search history.

(56) References Cited

U.S. PATENT DOCUMENTS 6,246,672 B1 * 6/2001 Lumelsky ............... H04L 29/06
370/310
8,527,276 B1 * 9/2013 Senior .................... G06N 3/084
704/259

(Continued)

FOREIGN PATENT DOCUMENTS

CN 101887719 A 11/2010
CN 102779508 A 11/2012
(Continued)

OTHER PUBLICATIONS

Office Action for Chinese Application No. 2018112513001 dated Mar. 18, 2020 in 12 pages.

(Continued)

*Primary Examiner* — Edgar X Guerra-Erazo
(74) *Attorney, Agent, or Firm* — Knobbe, Martens, Olson & Bear, LLP

(57) ABSTRACT

Embodiments of a speech broadcasting method, device, apparatus and a computer-readable storage medium are provided. The method can include: receiving recorded speech data from a plurality of speakers; extracting respective text features of the plurality of speakers from the recorded speech data, and allocating the plurality of speakers with respective identifications; and inputting the text features and the identifications of the speakers to a text-acoustic mapping model, to output speech features of the plurality of speakers; and establishing a mapping relationship between the text feature and the speech feature of each speaker. In the embodiments of the present application, a broadcaster can be selected to broadcast a text, greatly improving user experience of the text broadcasting.

11 Claims, 6 Drawing Sheets

(51) Int. Cl.
   *G10L 17/02* (2013.01)
   *G10L 17/06* (2013.01)
   *G10L 25/90* (2013.01)

(56) References Cited

U.S. PATENT DOCUMENTS

| | | | |
|---|---|---|---|
| 2013/0238337 A1* | 9/2013 | Kamai | G10L 21/003 704/258 |
| 2014/0025382 A1* | 1/2014 | Chen | G10L 13/10 704/260 |
| 2015/0186359 A1* | 7/2015 | Fructuoso | G10L 13/08 704/8 |
| 2016/0140951 A1* | 5/2016 | Agiomyrgiannakis | G10L 13/02 704/260 |
| 2016/0358597 A1 | 12/2016 | Panguluri et al. | |
| 2017/0092258 A1* | 3/2017 | Edrenkin | G10L 13/08 |
| 2018/0122361 A1* | 5/2018 | Silveira Ocampo | G10L 13/033 |
| 2019/0050875 A1* | 2/2019 | McCord | G10L 15/1815 |

FOREIGN PATENT DOCUMENTS

| | | |
|---|---|---|
| CN | 104485100 A | 4/2015 |
| CN | 104538024 A | 4/2015 |
| CN | 104934028 A | 9/2015 |
| CN | 105304080 A | 2/2016 |
| CN | 105304081 A | 2/2016 |
| CN | 106384586 A | 2/2017 |
| CN | 106791975 A | 5/2017 |
| CN | 107452400 A | 12/2017 |
| CN | 107464554 A | 12/2017 |
| KR | 20050041749 A | 5/2006 |

OTHER PUBLICATIONS

Search Report for Chinese Application No. 2018112513001 dated Mar. 10, 2020, in 4 pages.
Office Action for Chinese Application No. 2018112513001 dated Dec. 19, 2019 in 8 pages.
Search Report for Chinese Application No. 2018112513001 dated Dec. 10, 2019 in 7 pages.

* cited by examiner

SPEECH BROADCASTING METHOD, DEVICE, APPARATUS AND COMPUTER-READABLE STORAGE MEDIUM

CROSS-REFERENCE TO RELATED APPLICATION

This application claims priority to Chinese Patent Application No. 201811251300.1, entitled "Speech Broadcasting Method, Device, Apparatus and Computer-Readable Storage Medium", and filed on Oct. 25, 2018, which is hereby incorporated by reference in its entirety.

TECHNICAL FIELD

The present application relates to a field of internet technology, and in particular, to a speech broadcasting method, device, apparatus and a computer-readable storage medium.

BACKGROUND

Speech synthesis which is used to convert words to be synthesized into a speech has been widely used in novel reading, news broadcasting, map navigation broadcasting, intelligent speaker interacting and other products.

Currently, a new synthesized speech provided through the speech synthesis technology is obtained by: selecting a suitable speaker according to an application scenario, recording a speech from the speaker and labelling the recorded data, modeling with the data and producing a speech library, and providing a synthesizing service by uploading in a product. In order to obtain a good speech synthesis effect, a large amount of high-quality speech data need to be recorded for a current speaker. For example, a typical universal synthetic speech library is required to contain speeches with a total valid duration of more than 30 hours, which requires accurate labeling and checking for the speeches. The accurate labeling and checking results in high labor, time and economic costs for a synthetic speech library.

At the same time, recording, labeling and modeling of the speech library is performed serially in the prior arts, i.e. performed one by one for the speech library. Further, the constructing of a synthetic speech library puts high requirements for speakers, recording and labeling, which leads to a long time to construct a synthetic speech bank. For example, a typical speech library of 10 hours needs half to one year to be constructed from recording to providing a service.

SUMMARY

A speech broadcasting method, device, apparatus and a computer-readable storage medium are provided according to embodiments of the present application, so as to at least solve the above technical problems in the existing technology.

According to a first aspect, a speech broadcasting method includes:

receiving recorded speech data from a plurality of speakers;

extracting respective text features of the plurality of speakers from the recorded speech data, and allocating the plurality of speakers with respective identifications; and inputting the text features and the identifications of the speakers to a text-acoustic mapping model, to output speech features of the plurality of speakers; and establishing a mapping relationship between the text feature and the speech feature of each speaker.

In one implementation, the text feature includes: a phone, a tone, and a pause level of a phone.

In one implementation, the speech feature includes: a frequency spectral and a fundamental frequency of a speech.

In one implementation, the method further includes, for each speaker, establishing a mapping relationship between the identification of the speaker and broadcast information according to the speech features of the speakers, wherein the broadcast information includes at least one of a broadcast tone, a broadcast field, and a user crowd.

In one implementation, the method further includes: selecting a broadcasting speaker from the plurality of speaker according to current broadcast information.

In one implementation, the selecting a broadcasting speaker from the plurality of speaker according to current broadcast information includes:

obtaining the current broadcast information; and selecting the broadcasting speaker from the plurality of speakers according to the current broadcast information.

According to a second aspect, a speech broadcasting device includes:

a receiving module configured to receive recorded speech data from a plurality of speakers;

an extracting module configured to extract respective text features of the plurality of speakers from the recorded speech data, and allocate the plurality of speakers with respective identifications; and an outputting module configured to input the text features and the identifications of the speakers to a text-acoustic mapping model, to output speech features of the plurality of speakers; and establish a mapping relationship between the text feature and the speech feature of each speaker.

In one implementation, the text feature includes: a phone, a tone, and a pause level of a phone.

In one implementation, the speech feature includes: frequency spectral and a fundamental frequency of a speech.

In one implementation, the device further includes:

an establishing module configured to, for each speaker, establish a mapping relationship between the identification of the speaker and broadcast information according to the speech features of the speakers, wherein the broadcast information includes at least one of a broadcast tone, a broadcast field, and a user crowd.

In one implementation, the device further includes: a speaker selecting module configured to select a broadcasting speaker from the plurality of speaker according to current broadcast information.

In one implementation, the speaker selecting module includes:

an information obtaining sub-module configured to obtain the current broadcast information; and a selecting sub-module configured to select the broadcasting speaker from the plurality of speakers according to the current broadcast information.

In a third aspect, in a possible design, a speech broadcasting apparatus includes a processor and a storage, the storage is configured to store a program for supporting the above speech broadcasting method executed by the speech broadcasting device, the processor is configured to execute the program stored in the storage. The speech broadcasting apparatus further includes a communication interface configured for communication between the speech broadcasting apparatus and another apparatus or communication network.

In a fourth aspect, a computer-readable storage medium is provided for storing computer software instructions used by the speech broadcasting device, the computer software instructions include programs involved in execution of the above speech broadcasting method.

In the embodiments of the present application, a mixed modeling can be performed by recording speeches from a plurality of speakers, so that training data can be shared among a plurality of persons, thereby establishing a mapping relationship between text and acoustics quickly. In addition, in the embodiment of the present application, a broadcaster can be selected according to current scenario information, to greatly improve experience of the text broadcasting.

The above summary is for the purpose of the specification only and is not intended to be limiting in any way. In addition to the illustrative aspects, embodiments, and characters described above, further aspects, embodiments, and characters of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, certain embodiments are briefly described. As those skilled in the art would realize, the described embodiments may be modified in various different ways, all without departing from the spirit or scope of the present application. Accordingly, the drawings and description are to be regarded as illustrative in nature and not restrictive.

A speech broadcasting method and device is provided according to the present application. A specific processing flow and principle of the speech synthesis method and device according to an embodiment of the present application will be described in detail below.

Figure 1:
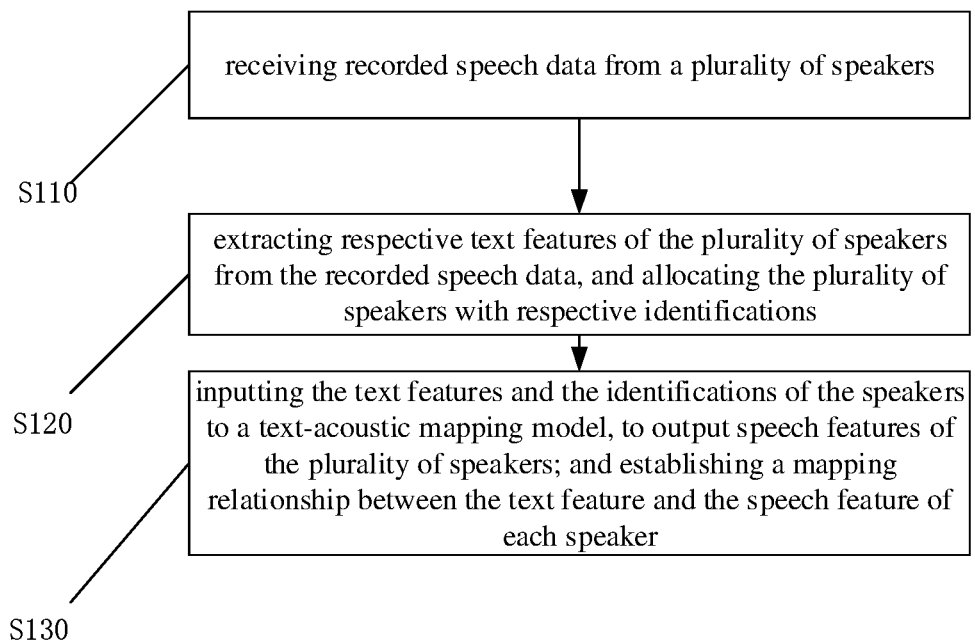
FIG. 1 is a flowchart of a speech broadcasting method according to an embodiment of the present disclosure.

FIG. 1 shows a speech broadcasting method according to an embodiment of the present application. The speech broadcasting method may include S110-S130.

S110: receiving recorded speech data from a plurality of speakers.

In one implementation, an existing recording mode of a large piece of data from a single speaker is replaced by a recording mode of a small piece of data from a plurality of speakers. For example, 1,000 sentences per person are recorded for 10 speakers, and a text for recording is not used repeatedly for the speakers. The total number of the texts for recording reaches 10,000 sentences, so that the total number of speeches to be recorded and labeled is equivalent to that with the traditional technology for a single speaker, and is actually operational.

S120: extracting respective text features of the plurality of speakers from the recorded speech data, and allocating the plurality of speakers with respective identifications.

After the recording, the text feature for the recorded data of each speaker is extracted firstly. According to a time duration, training data for the extracting can be selected as sentences, phrases, words, syllables, phones and even smaller semi-phones. In one embodiment, the text feature may be a phone, a tone, and a pause level of a phone. In addition, each of the plurality of speakers is allocated with an identification, for example, an ID (identity) feature is associated to each speaker. The ID feature of the speaker is also added to the training data to facilitate subsequent selection of the speaker.

S130: inputting the text features and the identifications of the speakers to a text-acoustic mapping model, to output speech features of the plurality of speakers; and establishing a mapping relationship between the text feature and the speech feature of each speaker.

In one embodiment, the modeling of the text-acoustic is a mixed modeling based on data from a plurality of persons. Firstly, the ID feature of the speaker in addition to a traditional text feature is input. Then, the training data is a mixture of data from a plurality of persons. Therefore, a text-to-acoustic mapping relationship for each speaker is included in a model as learned. Through the mixed modeling, a plurality of persons can share the mapping relationship between text and acoustic in the training data. That is to say, for a certain speaker, training data of other speakers is utilized in the modeling result of the speaker. In one embodiment, the speech feature includes: a frequency spectral and a fundamental frequency of a speech, such that different texts can be broadcasted by the same speaker.

For example, by a mixed acoustic modeling for a plurality of persons based on a deep neural network, data can be shared among different speakers, so that the model of a single speaker can utilize feature information included in other speaker data finally. For example, Chinese and English speech data are mixed and trained together. Finally, through the obtained model by training, a Chinese speaker can speak in English, and an English speaker can speak in Chinese.

Figure 2:
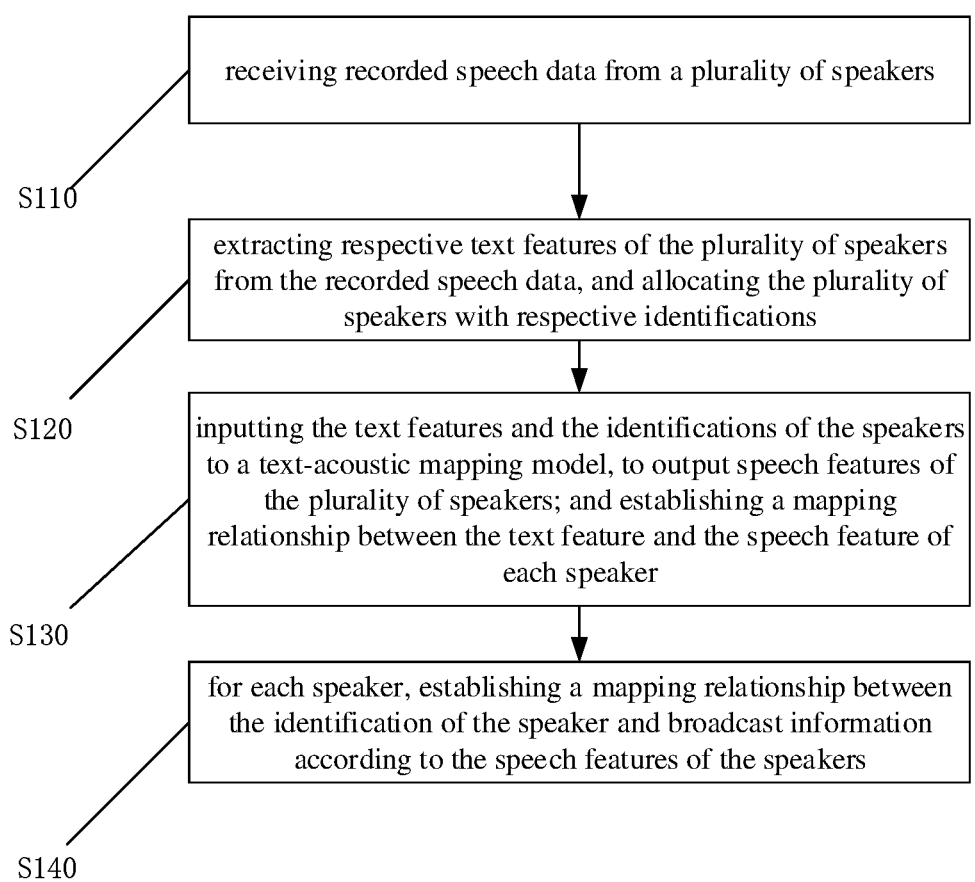
FIG. 2 is a flowchart of a speech broadcasting method according to another embodiment of the present disclosure.

In another embodiment, as shown in FIG. 2, the speech broadcasting method further includes:

S140: for each speaker, establishing a mapping relationship between the identification of the speaker and broadcast information according to the speech features of the speakers, wherein the broadcast information includes at least one of a broadcast tone, a broadcast field, and a user crowd.

In one implementation, when establishing a mapping relationship between the identification and the broadcast information of a speaker, a label may be added to the speaker according to one or more of tones, broadcast domains, user crowd, and weather. Firstly, a speaker can be labeled and then selected by automatically recommendation. For example, assume that 100 speakers can be recorded, and each speaker can be labeled with a plurality of characteristics, such as a tones, an area suitable for broadcasting, targeted user crowd, even weather and seasons suitable for broadcasting, and the like. For example, a certain speaker can be labelled with baritone, current news, white collars, sunshine, and the like.

Figure 3:
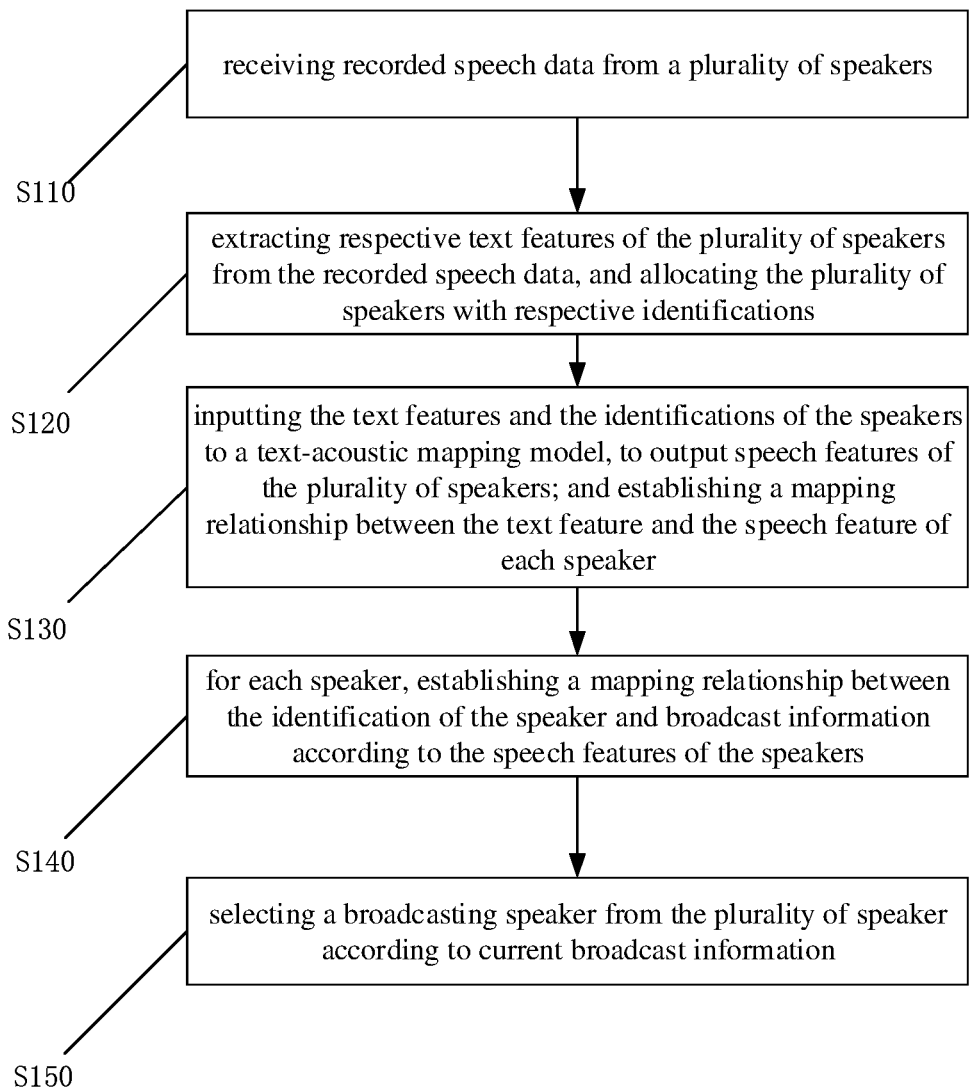
FIG. 3 is a flowchart of a speech broadcasting method according to another embodiment of the present disclosure.

In another embodiment, as shown in FIG. 3, the speech broadcasting method further includes:

S150: selecting a broadcasting speaker from the plurality of speaker according to current broadcast information.

Figure 4:
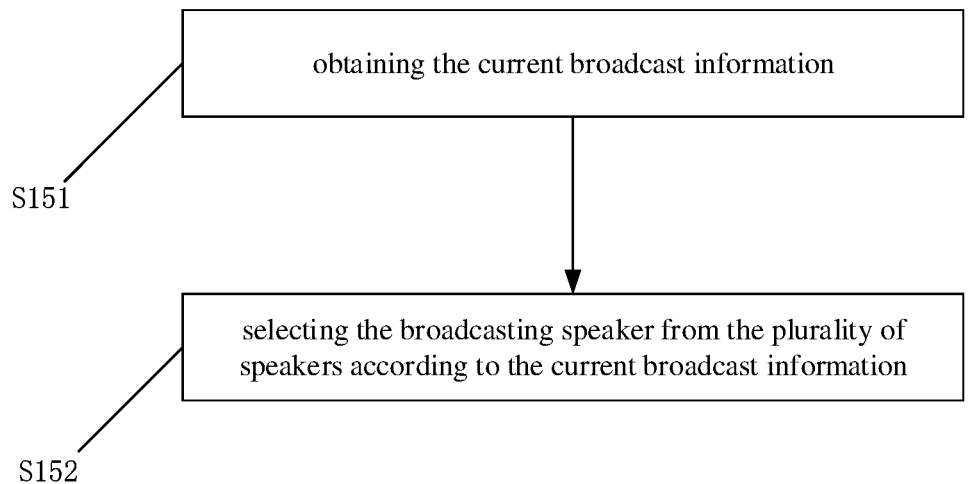
FIG. 4 is a specific flowchart of step S150 according to an embodiment of the present disclosure.

As shown in FIG. 4, in one implementation, S150 includes:

S151: obtaining the current broadcast information; and

S152: selecting the broadcasting speaker from the plurality of speakers according to the current broadcast information.

According to the current information of broadcast scenario, such as the current broadcast content, environment, and the like, a speaker can be selected from the plurality of speakers. For example, when broadcasting current affairs news, a relatively formal speaker can be selected. While broadcasting entertainment news, a relatively lively speaker can be selected.

In the embodiments of the present application, a mixed modeling can be performed by recording speeches from a plurality of speakers, so that the training data can be shared among a plurality of persons, thereby establishing a mapping relationship between text and acoustics quickly. In addition, in the embodiment of the present application, a broadcaster can be selected according to current scenario information, to greatly improve experience of the text broadcasting.

Figure 5:
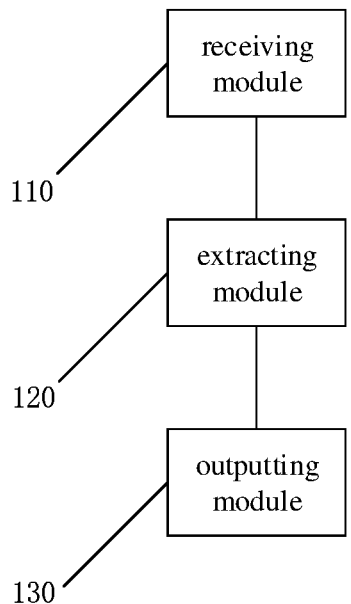
FIG. 5 is a connection block diagram of a speech broadcasting device according to an embodiment of the present disclosure.

An embodiment of the present application provides speech broadcasting device, as shown in FIG. 5, including:

a receiving module 110 configured to receive recorded speech data from a plurality of speakers;

an extracting module 120 configured to extract respective text features of the plurality of speakers from the recorded speech data, and allocate the plurality of speakers with respective identifications; and an outputting module 130 configured to input the text features and the identifications of the speakers to a text-acoustic mapping model, to output speech features of the plurality of speakers; and establish a mapping relationship between the text feature and the speech feature of each speaker.

Figure 6:
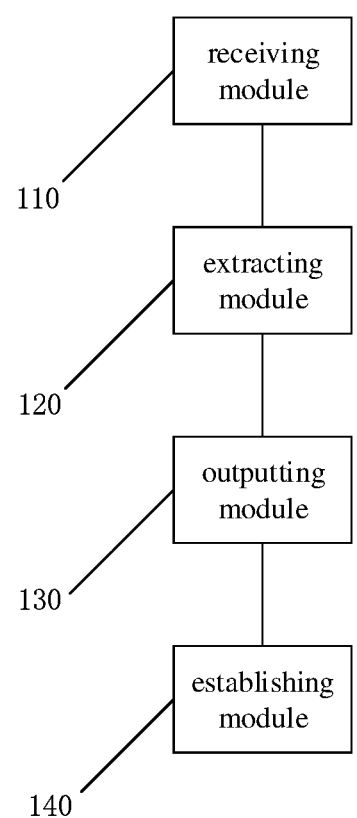
FIG. 6 is a connection block diagram of a speech broadcasting device according to an embodiment of the present disclosure.

As shown in FIG. 6, in an embodiment, the device further includes:

an establishing module 140 configured to, for each speaker, establish a mapping relationship between the identification of the speaker and broadcast information according to the speech features of the speakers, wherein the broadcast information includes at least one of a broadcast tone, a broadcast field, and a user crowd.

Figure 7:
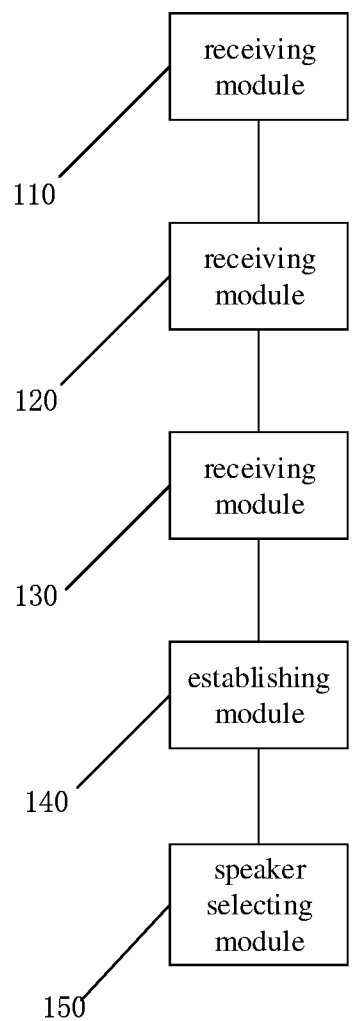
FIG. 7 is a connection block diagram of a speech broadcasting device according to an embodiment of the present disclosure.

As shown in FIG. 7, in an embodiment, the device further includes: a speaker selecting module 150 configured to select a broadcasting speaker from the plurality of speaker according to current broadcast information.

Figure 8:
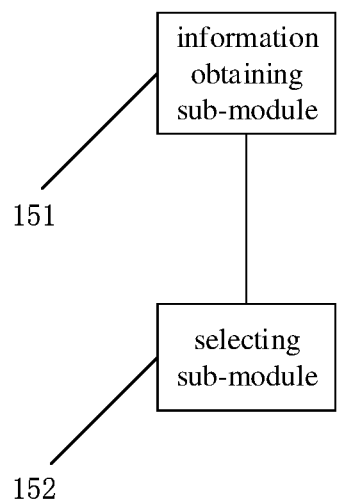
FIG. 8 is a connection block diagram of a speaker selecting module according to an embodiment of the present disclosure.

As shown in FIG. 8, in one implementation, the speaker selecting module includes:

an information obtaining sub-module 151 configured to obtain the current broadcast information; and a selecting sub-module 152 configured to select the broadcasting speaker from the plurality of speakers according to the current broadcast information.

In this embodiment, functions of modules in the device refer to the corresponding description of the above mentioned method and thus the description thereof is omitted herein.

Figure 9:
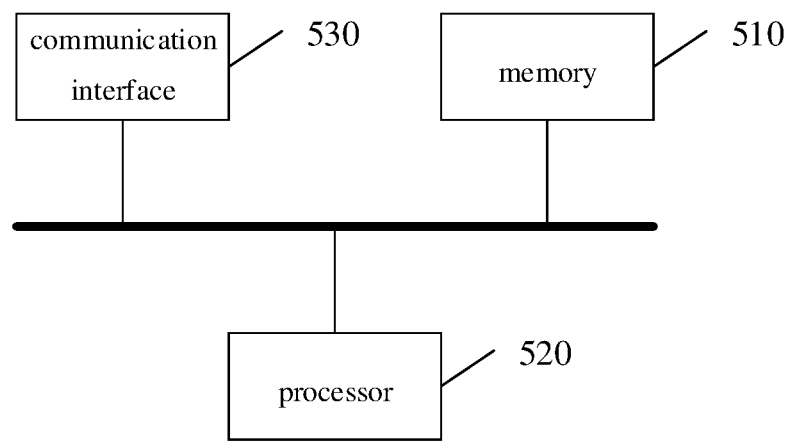
FIG. 9 is a block diagram of a speech broadcasting apparatus according to another embodiment of the present disclosure.

As shown in FIG. 9, a speech broadcasting apparatus is provided in an embodiment of the present application, including a memory 510 and a processor 520. The memory 510 stores a computer program executable on the processor 520. When the processor 520 executes the computer program, the speech broadcasting method in the foregoing embodiment is implemented. The number of the memory 510 and the processor 520 may be one or more.

The speech broadcasting apparatus further includes:

a communication interface 530 configured to communicate with an external device and exchange data.

The memory 510 may include a high-speed RAM memory and may also include a non-volatile memory, such as at least one magnetic disk memory.

If the memory 510, the processor 520, and the communication interface 530 are implemented independently, the memory 510, the processor 520, and the communication interface 530 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 9, but it does not mean that there is only one bus or one type of bus.

Optionally, in a specific implementation, if the memory 510, the processor 520, and the communication interface 530 are integrated on one chip, the memory 510, the processor 520, and the communication interface 530 may implement mutual communication through an internal interface.

According to an embodiment of the present application, a computer-readable storage medium is provided for storing computer software instructions, which include programs involved in execution of the above speech broadcasting method.

In the description of the specification, the description of the terms "one embodiment," "some embodiments," "an example," "a specific example," or "some examples" and the like means the specific characters, structures, materials, or characteristics described in connection with the embodiment or example are included in at least one embodiment or example of the present application. Furthermore, the specific characters, structures, materials, or characteristics described may be combined in any suitable manner in any one or more of the embodiments or examples. In addition, different embodiments or examples described in this specification and characters of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical characters. Thus, characters defining "first" and "second" may explicitly or implicitly include at least one of the characters. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A speech broadcasting method, comprising:
   receiving recorded speech data from a plurality of speakers;
   extracting respective text features of the plurality of speakers from the recorded speech data, and allocating the plurality of speakers with respective identifications; and
   inputting the text features and the identifications of the speakers to a text-acoustic mapping model, to output speech features of the plurality of speakers; and
   establishing a mapping relationship between the text feature and the speech feature of each speaker;
   wherein the method further comprises, for each speaker, establishing a mapping relationship between the identification of the speaker and broadcast information according to the speech features of the speakers, wherein the broadcast information comprises at least one of a broadcast tone, a broadcast field, and a user crowd.

2. The speech broadcasting method according to claim 1, wherein the text feature comprises a phone, a tone, and a pause level of a phone.

3. The speech broadcasting method according to claim 1, wherein the speech feature comprises a frequency spectral and a fundamental frequency of a speech.

4. The speech broadcasting method according to claim 1, further comprising selecting a broadcasting speaker from the plurality of speakers according to current broadcast information.

5. The speech broadcasting method according to claim 4, wherein the selecting a broadcasting speaker from the plurality of speaker according to current broadcast information comprises:
   obtaining the current broadcast information; and
   selecting the broadcasting speaker from the plurality of speakers according to the current broadcast information.

6. A non-transitory computer-readable storage medium, in which a computer program is stored, wherein the computer program, when executed by a processor, causes the processor to perform the method of claim 1.

7. A speech broadcasting device, comprising:
   one or more processors; and
   a non-transitory storage device configured for storing one or more programs, wherein
   the one or more programs are executed by the one or more processors to enable the one or more processors to:
   receive recorded speech data from a plurality of speakers;
   extract respective text features of the plurality of speakers from the recorded speech data, and allocate the plurality of speakers with respective identifications; and
   input the text features and the identifications of the speakers to a text-acoustic mapping model, to output speech features of the plurality of speakers; and establish a mapping relationship between the text feature and the speech feature of each speaker;

wherein the one or more programs are executed by the one or more processors to enable the one or more processors to:

for each speaker, establish a mapping relationship between the identification of the speaker and broadcast information according to the speech features of the speakers, wherein the broadcast information comprises at least one of a broadcast tone, a broadcast field, and a user crowd.

8. The speech broadcasting device according to claim 7, wherein the text feature comprises: a phone, a tone, and a pause level of a phone.

9. The speech broadcasting device according to claim 7, wherein the speech feature comprises: a frequency spectral and a fundamental frequency of a speech.

10. The speech broadcasting device according to claim 7, wherein the one or more programs are executed by the one or more processors to enable the one or more processors to select a broadcasting speaker from the plurality of speaker according to current broadcast information.

11. The speech broadcasting device according to claim 10, wherein the one or more programs are executed by the one or more processors to enable the one or more processors:

obtain the current broadcast information; and select the broadcasting speaker from the plurality of speakers according to the current broadcast information.

\* \* \* \* \*